July 8, 1969   K. H. MARCUS   3,454,692
METHOD OF FORMING VEHICULAR REARVIEW MIRRORS
Filed March 11, 1965

INVENTOR.
KONRAD H. MARCUS
BY
ATTORNEYS

United States Patent Office 3,454,692
Patented July 8, 1969

3,454,692
METHOD OF FORMING VEHICULAR REARVIEW MIRRORS
Konrad H. Marcus, Holland, Mich., assignor to Donnelly Mirrors, Inc., Holland, Mich., a corporation of Michigan
Filed Mar. 11, 1965, Ser. No. 439,041
Int. Cl. B32b *17/10*
U.S. Cl. 264—135          3 Claims

ABSTRACT OF THE DISCLOSURE

A method is provided for making vehicular rearview mirrors wherein an elongated body of a heat settable vinyl containing thermoplastic resin having a front bonding surface and a back decorative face is formed around a portion of a mounting connector. The connector is supported so that the remaining portions project from the back face. The back side of a glass mirror plate having a bonding layer thereon is pressed tightly against said front surface and said plate is bonded to said elongated body by heating said elongated body to rigidify it and fixedly anchor said connector. The bonding layer is selected from the group consisting of poly epoxy resins, acrylates, and combinations thereof.

---

This invention relates to vehicular rearview mirror assemblies, and more particularly to a novel method of fabricating a rearview mirror assembly.

Vehicular rearview mirror assemblies must be capable of secure and stable mounting to the vehicle, using a one point, centrally located mount, allowing convenient, universal adjustment for up and down and side to side positioning. The conventional method of fabricating a rearview mirror assembly includes the steps of forming a receiving metal casing as by die stamping techniques, positioning an exactly-ground, glass mirror in it, and peripherally crimping the casing edge over the edge of the mirror to anchor it tightly. A mounting bracket is bolted or riveted to the back side of the casing.

This method, although almost universally practiced, involves several undesirable features. These include the expense of the specially formed casing, and the grinding precision necessary to assure a proper fit of the glass and frame without looseness of the glass and without crushing the glass during the crimping operation. These is presently a relatively limited number of casing styles and configurations possible because of the criticality of these assembling techniques believed necessary. Further, substantial labor is required for complete fabrication and assembly. Also, the casing must be metal.

It is an object of this invention to provide a unique method of fabricating vehicular rearview mirror assemblies, requiring no preforming of special casings of metal or the like.

Another object of this invention is to provide a rearview mirror assembly enabling relatively rapid fabrication, and eliminating the many assembly operations normally required.

A further object of this invention is to provide a method of forming a rearview mirror assembly that removes the necessity for extremely accurate peripheral grinding on the glass element. It achieves a firm assembly in the final product even though the glass element varies considerably in its dimensions. The method also enables the mirror assembly to be of practically an endless variety of styles and configurations, yet with the glass being firmly and securely retained in the assembly. Moreover, the method effects on the rearview mirror assembly a centrally located mount to enable convenient universal adjustment of the mirror.

Another object of this invention is to provide a unique method of fabricating rearview mirrors enabling wide variation in color of the mirror backing as well as surface characteristics, style, and configuration, thereby allowing extensive selections of aesthetic characteristics to suit the vehicular decor.

These and several other objects of this invention will become apparent upon studying the following specification in conjunction with the drawings in which.

Figure 1:
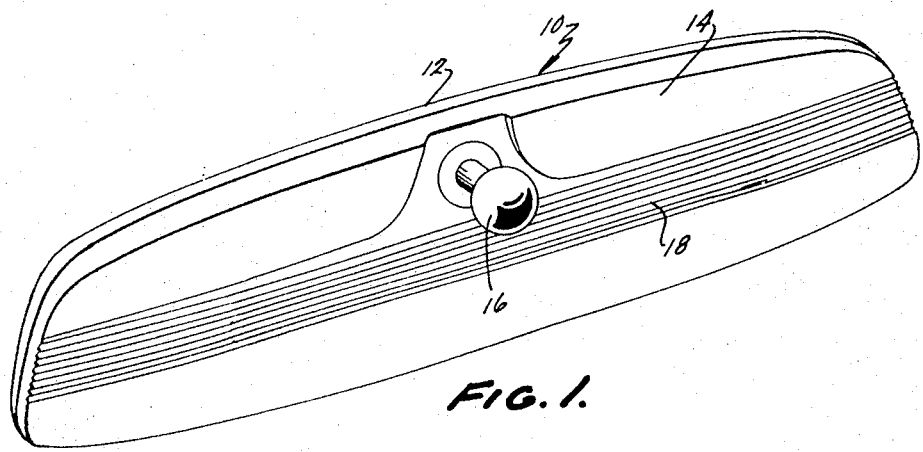
FIG. 1 is a perspective view of the back side of one form of the mirror formed by the novel method.

Referring now specifically to the drawings, the mirror assembly 10 formed by the novel process includes a glass plate 12 having a front surface or second surface reflective coating thereon, a polymeric backing casing 14, and a mounting bracket element 16 projecting from the longitudinal center of the back. Whether the reflective surface is a front or second surface reflector does not matter to the method.

This is the complete mirror assembly, with no additional frame being utilized when formed by the novel method. The polymeric backing has a decorative design illustrated simply by elongated striations 18 as one example. Alternatively, it may have a wood-simulating texture or some other design characteristic. The color of the backing may vary widely to suit the vehicular decor. The configuration of the mirror is shown generally oblong with larger radius corners at the top, and tapered from a thick central portion to thinner end portions, in modern style. These styling features represent only one of countless variations possible with the novel method.

Figure 2:
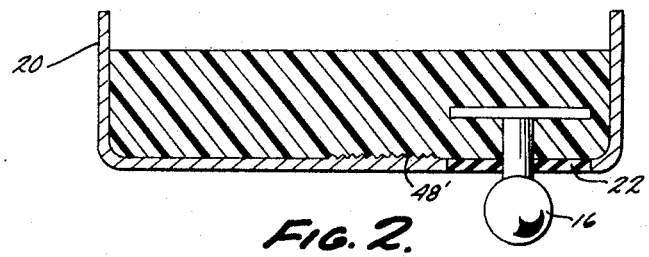
FIG. 2 is a sectional view of a mirror and mold, showing the first step in the novel method of forming a rearview mirror.
Figure 3:
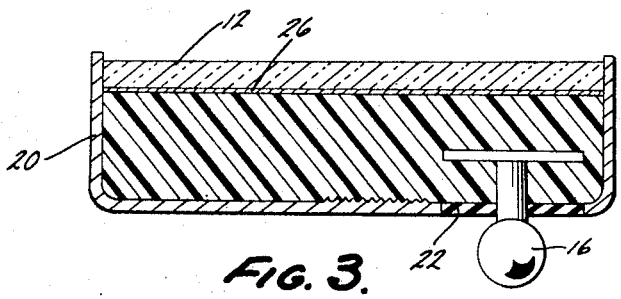
FIG. 3 is a sectional view of the mirror and mold, showing a later step of the novel method of forming the rearview mirror.

The mirror assembly is formed according to the process shown generally in FIGS. 2 and 3. These figures represent a cross section through the center of a mold for the mirror in FIG. 1. The mold 20 of selected peripheral and bottom configuration is provided to create the mirror configuration and styling. In the bottom of the mold is an opening containing an orificed resilient element 22 which enables a mounting bracket 16 to project partially into the mold and partially out of it. This resilient element is located centrally, longitudinally of the ends, to enable the mounting bracket to be so mounted. The mounting bracket is shown to include a spherical ball on the outer end, and an enlarged head on the inner end, with a shank connecting the two. This particular structure may be varied to suit the type of mounting assembly desired. It allows universal adjustment. If effects secure anchoring of the bracket because of the enlarged head to be embedded in the backing. The mold bottom also includes a pattern negative 18' to form the desired decorative back surface 18.

The mirror assembly is formed by placing bracket element 16 in the position illustrated in FIG. 2 as by pushing it down through the resilient orificed element 22 from the inside of the mold. When it is properly positioned as shown, polymer 48' in a flowable state is introduced into the mold to the depth substantially equivalent to the desired final thickness. In the preferred form of this method, the polymer is a poly vinyl chloride polymer. If it is in the form of a plastisol, as noted below, i.e. in the form of vinyl particles dispersed in a plastisol, it may be merely poured into the mold, with little or no pressure. This polymer serves to subsequently anchor the mounting element support by embedding the enlarged head and part of the shank of the support.

When the preferred vinyl polymer is used, glass plate 12 to be secured thereto is coated with a primer coat 26. This primer is an adhesion promoting resin which will cause the vinyl to tightly bond and seal to the back of the mirror plate. It may be of the conventional type used for this purpose, for example, acrylates or poly epoxy resins or some other selected thermosetting or thermoplastic resin achieving an irremovable bond and an air tight seal between the vinyl plastisol and the mirror back. A typical example is an amonified acrylic material. The adhering substance is preferably either a bodied adhesive containing a solvent which dries by evaporation or alternatively an elastomeric adhesive based on rubber in solution or suspension. The materials do not chemically react with the metallic film used for the reflective surface, if the mirror is a second surface reflector.

The primer coated mirror plate is then placed with the back coated side in contact with the upper surface of the vinyl polymer. It is pressed into firm and complete engagement with the vinyl so as to form an effective seal. Then, the backing polymer is fused by elevating its temperature above its known fusion temperature. This may be done by heating mold 20 above the fusion temperature. This is a temperature above about 400° F. when a poly vinyl material is employed. This solidifies the backing into a unitary body and bonds the plate to the backing, causing a secure, stable, sealed self-supporting connection therebetween. As can be seen from the drawings, the solidified resin backing supports the glass plate solely through the adhesive bond between the plate 12 and the resin backing 14. It also simultaneously secures the embedded enlarged head anchoring portion of the mounting element in the backing, to complete the assembly.

Upon subsequent cooling, the rearview mirror assembly is removed from the mold simply by pushing the ball portion of the anchor element through its resilient member 22 to enable the assembly to be grasped and removed. The assembly is then ready for mounting in a vehicle. No metal frame is used.

In providing the backing polymer, if the preferred poly vinyl chloride is employed, low temperature flexibility properties can be enhanced by utilizing plasticizers such as adipates, azalates or sebacate esters incorporated into the vinyl plastisol. Also, suitable conventional stabilizing agents such as metallic salts of fatty acids or soaps may be used. Although the vinyl has been found to form the most preferred backing, other less preferred polymers could conceivably be used, such as poly epoxy-poly amine resins, poly urethane, silicone, rubber, cellulosic, fluorocarbons, polyacetals, polycarbonates, and polypropylenes.

The versatility of the method to form rearview mirror assemblies of selected configuration, style color and back design is very great. Various additional advantages may occur to those in the art upon studying the foregoing illustrative form of the invention. Also certain minor variations in the novel method may be conceived within the concept presented.

I claim:

1. A method of making vehicular rearview mirrors comprising the steps of: forming around a portion of a mounting connector an elongated body of a heat settable vinyl containing thermoplastic resin having a front bonding surface and a back decorative face, while supporting said conductor so that the remaining portions project from said back face while said portion is embedded; pressing the back side of a glass mirror plate having a bonding layer thereon tightly against said front surface, said bonding layer being selected from the group consisting of poly epoxy resins, acrylates, and combinations thereof, and bonding said plate to said elongated body by heating said elongated body to rigidify it and fixedly anchor said connector, thereby integrating said connector, body, and plate into an integral, self-supporting rearview mirror unit.

2. A method of making a vehicular rearview mirror comprising the steps of: providing an oblong mold containing a mold cavity for polymer molding; projecting a portion of a mirror mounting connector into the base of said oblong mold cavity, generally centrally of its length, with the other portion projecting out of said cavity; introducing a heat settable thermoplastic vinyl containing resin into said mold cavity, embedding the projecting portion of said connector; providing a reflective glass mirror plate having on the back surface thereof an adherent bonding layer of a material selected from the group consisting of poly epoxy resins, acrylates and mixtures thereof, said mirror plate being shaped like the cross section of said mold cavity; forcing the back surface of said plate into complete sealing contact with the surface of said resin in said cavity; bonding said plate to said resin by heating to fuse said polymer while retaining said plate in contact with said surface, thereby integrating the components into an integral self-supporting rearview mirror unit; and removing the mirror unit from said mold.

3. A method of making an integral vehicular rearview mirror assembly comprising the steps of: providing a mounting bracket, a reflective glass mirror plate, and a mold containing a mold cavity having a cross sectional configuration corresponding to the peripheral configuration of the plate; coating the back surface of the plate with a layer of material selected from the group consisting of poly epoxy resins, acrylates, and combinations thereof; introducing a portion of the mounting bracket into the mold cavity, introducing a heat settable thermoplastic vinyl containing resin in a flowable state into the mold cavity to embed said bracket portion, then forcing said layer of material on the plate into sealing contact with said thermoplastic vinyl containing resin; and bonding said thermoplastic vinyl containing resin to the back surface of the plate by heating said thermoplastic polymer to fuse it to a solid state while in sealing contact with said plate.

References Cited

UNITED STATES PATENTS

| | | | |
|---|---|---|---|
| 2,213,708 | 9/1940 | Lange | 264—271 X |
| 2,270,270 | 1/1942 | Clare. | |
| 2,817,619 | 12/1957 | Bickel et al. | 264—245 |
| 2,911,177 | 11/1959 | West | 248—484 |
| 3,026,575 | 3/1962 | Lusher et al. | 264—135 |
| 2,064,514 | 12/1936 | Balz. | |
| 3,192,567 | 7/1965 | Abernethy. | |
| 1,997,500 | 4/1935 | Swarovski. | |
| 2,911,177 | 11/1959 | West | 350—293 |
| 2,652,651 | 9/1953 | La Barbera | 264—261 |

FOREIGN PATENTS 463,972  3/1950  Canada.

OTHER REFERENCES

Henry Lee and Kris Neville: Epoxy Resins, 1957, p. 216.

ROBERT F. WHITE, Primary Examiner.

J. H. SILBAUGH, Assistant Examiner.

U.S. Cl. X.R.

248—481; 264—275, 279